US006434502B1

(12) United States Patent
Harrison

(10) Patent No.: US 6,434,502 B1
(45) Date of Patent: Aug. 13, 2002

(54) AUTOMATIC UPDATING OF TEST MANAGEMENT SYSTEM WITH TEST RESULTS ENTERED INTO AN ELECTRONIC LOGBOOK

(75) Inventor: Michael John Harrison, Wood Dale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/329,689

(22) Filed: Jun. 10, 1999

(51) Int. Cl.[7] .............................................. G06F 19/00
(52) U.S. Cl. ........................ 702/122; 702/122; 700/89
(58) Field of Search ................... 702/84, 122; 364/579, 364/551, 900

(56) References Cited

U.S. PATENT DOCUMENTS 5,757,680 A * 5/1998 Boston et al. ............... 364/579
5,790,977 A * 8/1998 Ezekiel ........................ 702/122
5,918,191 A * 6/1999 Patel ............................ 702/84
6,070,131 A * 5/2000 Damon et al. ............... 702/122

\* cited by examiner

*Primary Examiner*—John S. Hilten
*Assistant Examiner*—Douglas N Washburn
(74) *Attorney, Agent, or Firm*—Sitrick & Sitrick

(57) ABSTRACT

A test data system includes a first computer system that has an electronic logbook. Test results are entered into the electronic logbook by the user/test person. The electronic logbook contains the e-mail address of a logbook program in a second computer system. The test results are forwarded by e-mail to the logbook program, which parses the test results and formats them for the entry in a test results database of a test management system. A test management system program is run to update the test results database with the test results and sends confirmation and/or any error messages back to the user at the first computer system.

18 Claims, 6 Drawing Sheets

FIG. 3

```

Get logbook entry from stdin get_logbook_entry

Extract data from logbook header get_lab
get_run_time
get_load_and_proj
get_logbk_login
get_logbk_entryno

Parse test results data parse_test_info

Update the TMS results database and log usage
if not in code testing mode if [[ -n ${LOGBKTMS_TEST} ]]
then
        $PAGER ${datafile}
else
        update_tms
        log_tool_use
fi
```

FIG. 4

```
------------------------------------------
Log Entry Number 11069265
------------------------------------------
Lab: GLBL1.0, test, duplex

START DATE/TIME: 10/07/93 16:00
END DATE/TIME:   10/07/93 20:00

AUTHOR: Mike Harrison
   LOGIN: michaelj
   EMAIL: ihgp!michaelj
   DEPARTMENT:NA5110700      PHONE: x99422      WPN: 1252161124

SUPERVISOR: S.Ohnsman              EMAIL: ihgp!saohn

LAB USERS: m.harrison
ADDITIONAL MAIL: ihecms!ogbktms

GENERIC: 5ee12_1u    LOAD: u8.0.0     ODD: TWI

FUNCTION/ACTIVITY: regr test
   APPLICATION: gtwy             FEATURE: -

PRODUCTIVITY RATING: 4
------------------------------------------
TEST PLAN:
Execute the remaining tests in the test plan

ACCOMPLISHMENTS:

indicate the TMS Setname, Appl,and Grp field values:

SETNAME=pe_5ee12_regr
APPL=TWI
GRP=run1

List the results of the testing using the following format:

<test ID> <status> <tester name> <optional IMR#> <optional comments> aa0001 0 m.harrison

Three-way calling is now working for this new software release aa0002 1 m.harrison 123456 B party did not ring This test failed in a peculiar way. When A party went
  off hook, it should have triggered a hotline call to B party.
  but B party did not ring. Instead, A party received a
  call waiting tone, which was completely unexpected.

aa0003 6 m.harrison  Not enough phones available to execute this test

GRP=run2 ab0004 0 m.harrison
ab0005 4 m.harrison Test under study. Unknown ROP report is printed.

The call from A to B party worked, but an MD11 report was printed
  on the ROP which may or may not be related to the call. I'll have
  to talk with an expert and determine whether or not this is a problem.
```

FIG. 5A

```
setname=pe_5ee12_regr
TMSPROJ=5ee12_1u
appl=TWI
grp=run1
tidnum=aa0001
rload=u8.0.0
rplace=GLBL1.0
tester=m.harrison
rexectime=
run=10/07/93 16:00
tmsload=TWI
official=y
rmode=MAN
status=0
imrno=
fastat=
casestat=
rcomment=
```

FIG. 5B

```
setname=pe_5ee12_regr
TMSPROJ=5ee12_1u
appl=TWI
grp=run1
tidnum=aa0002
rload=u8.0.0
rplace=GLBL1.0
tester=m.harrison
rexectime=
run=10/07/93 16:00
tmsload=TWI
official=y
rmode=MAN
status=1
imrno=123456
fastat=
casestat=
rcomment=B party did
           not ring
```

FIG. 5C

```
setname=pe_5ee12_regr
TMSPROJ=5ee12_1u
appl=TWI
grp=run1
tidnum=aa0003
rload=u8.0.0
rplace=GLBL1.0
tester=m.harrison
rexectime=
run=10/07/93 16:00
tmsload=TWI
official=y
rmode=MAN
status=6
imrno=
fastat=
casestat=
rcomment=Not enough
           phones available to
           execute this test
```

FIG. 5D

```
setname=pe_5ee12_regr
TMSPROJ=5ee12_1u
appl=TWI
grp=run2
tidnum=ab0005
rload=u8.0.0
rplace=GLBL1.0
tester=m.harrison
rexectime=
run=10/07/93 16:00
tmsload=TWI
official=y
rmode=MAN
status=4
imrno=
fastat=
casestat=
rcomment=Test under study.
           Unknown ROP
           report is printed
```

FIG. 5E

```
setname=pe_5ee12_regr
TMSPROJ=5ee12_1u
appl=TWI
grp=run2
tidnum=aa0004
rload=u8.0.0
rplace=GLBL1.0
tester=m.harrison
rexectime=
run=10/07/93 16:00
tmsload=TWI
official=y
rmode=MAN
status=0
imrno=
fastat=
casestat=
rcomment=
```

FIG. 6

```
----------------------------------------
Log Entry Number 11069265
----------------------------------------
Lab:(GLBL1.0) test, duplex

START DATE/TIME: (04/22/99 16:00)
  END DATE/TIME: 04/22/99 20:00

AUTHOR: Mike Harrison
        LOGIN: michaelj
        EMAIL: ihgp!michaelj
   DEPARTMENT:NA5110700    PHONE: x99422     WPN: 1252161124

SUPERVISOR: S.Ohnsman              EMAIL: ihgp!saohn

LAB USERS: m.harrison v.klick
ADDITIONAL MAIL: ihecms!ogbktms

GENERIC:(5ee12_1u)    LOAD:(u8.0.0)    ODD:(TW1)
FUNCTION/ACTIVITY: regr test
      APPLICATION: gtwy                FEATURE: -

TEST PLAN:

Execute 3 remaining tests

ACCOMPLISHMENTS:

SETNAME=(pe_5ee12_regr)
APPL=(TW1)
GRP=(run1)

aa0001 0 m. harrison
(ad3425)(1)(v. klick) (123456) (B party no ring)

When A party went offhook, it should have triggered a hotline call
to B party, but B party did not ring. Instead, A party received a
call waiting tone, which was completely unexpected. Called the
developer, confirmed the problem, then opened IMF trouble ticket 123456.

au7863 4 m.harrison / No output report

The test script says an output report should appear on the output
printer, but none was generated. Developer was not available to verify
if this is a hardware problem or test script problem. Still under study.

----------------------------------------
setname=pe_5ee12_regr   setname=pe_5ee12_regr   setname=pe_5ee12_regr
TMSPROJ=5ee12_regr      TMSPROJ=5ee12_regr      TMSPROJ=5ee12_regr
appl=TW1                appl=TW1                appl=TW1
grp=run1                grp=run1                grp=run1
tidnum=aa0001           tidnum=ad3425           tidnum=au7863
rload=u8.0.0            rload=u8.0.0            rload=u8.0.0
rplace=GLBL1.0          rplace=GLBL1.0          rplace=GLBL1.0
tester=m.harrison       tester=v.klick          tester=m.harrison
run= 04/22/99 16:00     run= 04/22/99 16:00     run= 04/22/99 16:00
tmsload= TW1            tmsload= TW1            tmsload= TW1
rmode= MAN              rmode= MAN              rmode= MAN
status=0                status=1                status=6
imrno=                  imrno=123456            imrno=
rcomment=               rcomment=B party no ring  rcomment=No output report
                                                  └─DEFAULTED BY TOOL
```

AUTOMATIC UPDATING OF TEST MANAGEMENT SYSTEM WITH TEST RESULTS ENTERED INTO AN ELECTRONIC LOGBOOK

BACKGROUND OF THE INVENTION

This invention relates generally to Test Management Systems (TMS) and particularly to the updating of the test results in a TMS test results database. While this invention is directly related to and described in connection with the testing of electronic switching systems, it will readily be appreciated that it is applicable to any type of testing arrangement or program in which a database is to be updated. In this connection, the term Test Management System is intended to be applicable to all types of arrangements for accumulating test data and not limited to the described embodiment of the invention.

A TMS is typically used to store various test scripts, software programs, test results, and their associated status in a TMS database. A TMS generally includes user commands to add data to the TMS database, to query the TMS database, and to generate reports based on information in the TMS database.

In present practice, when a user test person conducts tests on an electronic switching system, whether in the laboratory or in the field, the user manually enters the appropriate test results as an electronic logbook entry in an electronic logbook system (ELS) detailing the results of the testing session. A TMS separate and distinct from the ELS must also be updated with the results of the testing session. This is presently accomplished by the user manually entering the appropriate test results data in a TMS test results database. The format of data entry in the TMS is typically highly structured, and different and distinct from the relatively free form data entry for the ELS. The duplication of effort required in the present practice to update both an ELS and a TMS is not only time consuming, but engenders additional exposure to errors in data entry.

With the present invention, at the end of a testing session, the user fills out a logbook entry in an ELS that is included in a first computer system. The entry in the electronic logbook describes the testing activity, which includes status information for each test script executed. The logbook entry is minimally formatted such that a tool in a second computer system can parse the logbook entry for addition into a test results database in a TMS. The entry in the logbook is then forwarded by the first computer system to a dedicated e-mail address on a second computer system.

In the present invention, when the logbook entry is received by the second computer system at the dedicated e-mail address, a process is started which parses the logbook entry and reformats the data contained in the logbook entry into a highly structured different format suitable for entry into a TMS. Upon successful formatting, the second computer subsequently generates a command to insert the formatted entry into the TMS. Information regarding the success of the reformatting and insertion is then relayed back to the user, along with any error messages that may have been generated, for the user's information.

SUMMARY OF THE INVENTION

The inventive method and apparatus comprises a user entering the results of a test in an electronic logbook that is part of a first computer system. The entry in the electronic logbook describes the testing activity, which includes status information for each test script executed. The logbook entry is e-mailed to a second computer system associated with a TMS. The TMS may be resident in the second computer system or may be separate, but accessible thereto. The second computer system receives the logbook entry, parses and extracts the pertinent data, and formats the data for entry into the TMS. The parsing routine comprises a series of Unix commands that extract the data from the logbook entry and reformat it into a different highly structured format suitable for insertion into the TMS database. The second computer subsequently submits the data to the TMS, and returns information about the submission back to the user via e-mail. These and other attributes of the present invention will be discussed with reference to the following drawings and accompanying specification.

BRIEF DESCRIPTION OF THE DRAWINGS:

FIG. 3 illustrates a software program listing for an embodiment of a logbook program utilized in accordance with one aspect of the present invention.

FIG. 4 illustrates an example of an electronic logbook entry as entered by a user.

FIGS. 5A, 5B, 5C, 5D, and 5E illustrate examples of TMS entries formatted as required by a TMS system.

FIG. 6 illustrates an example of the mapping process to reformat an electronic logbook entry to a format suitable for a TMS system.

Figure 1:
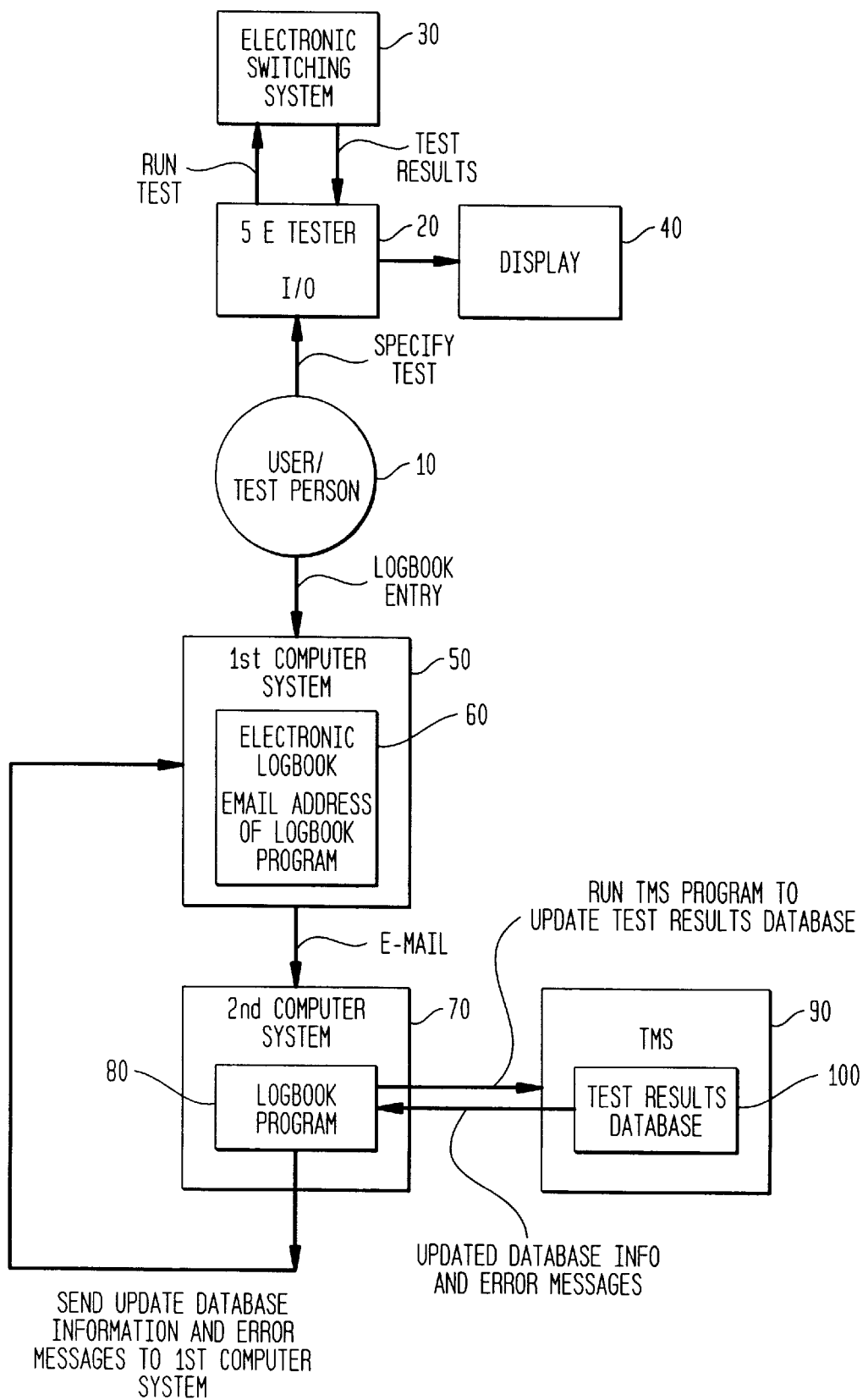
FIG. 1 is a simplified block diagram illustrating the overall architecture of the invention.

DETAILED DESCRIPTION OF THE PREFERRED EMBODIMENT:

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

Referring to FIG. 1, a user 10 specifies a test or test sequence for a telephone systems tester 20 via its I/O port. Any of a number of well-known testers may be used for testing electronic telephone switching systems, such as Lucent Technologies trademarked 5ESS electronic telephone switch, which has been in use for a number of years. Tester 20 conducts selected tests on an electronic switching system 30 and the test results are compiled by the tester 20 and displayed on a display 40 to the user 10. As discussed above, the test routines or shell scripts are predetermined and the resulting data is returned in a preselected form.

In practice, the user executes a test on the system under test, e.g. the electronic switching system 30, usually by providing one or more stimuli (test inputs) to the switch. The switch responds with one or more outputs (log files, reports, acknowledgements, etc.) from which the user can determine whether or not the test was successful.

In the preferred embodiment of the present invention, the user 10 physically enters a summary of the test into an electronic logbook system (ELS) 60 in a first computer system 50. The entered summary data, which may include but is not limited to the test ID number, the test author, the test revision, the test date, the test time, the test status (pass, fail, blocked, etc.) the user's name and any additional notes regarding the test, is in a flexible format that is both standardized to be parsed by a LOGBKTMS program and is suitable for the electronic logbook In another preferred embodiment, the summary data may be partially created or filled in by the tester 20, thus saving data entry time and reducing chances for data entry errors.

In the present invention the first computer system 50 does not process any of the data in the logbook entry. The ELS 60 includes, among other data, any e-mail addresses where the logbook entry is to be sent or forwarded, particularly including a predefined and dedicated e-mail address 80 in a second computer system 70.

After the user has completed the logbook entry, in accordance with the present invention a copy of the logbook entry is then e-mailed from the first computer system 50 to second computer system 70 responsive to the dedicated e-mail address 80. Upon receipt of the copy of the logbook entry at the dedicated e-mail address the second computer system executes the LOGBKTMS program 80 on that copy. The e-mail copy of the logbook entry is deleted when the LOGBKTMS program finishes execution.

The LOGBKTMS program of the present invention parses the information contained in the copy, extracts the relevant data, and reformats it for entry into a test results database 100 in a TMS 90 that is either part of or accessible to the second computer system. The LOGBKTMS program further executes a TMSRUN program that is run to update the test results database 100 with the parsed test results. The TMSRUN program is a particular example of a generic class of data entry programs for any generic TMS. The TMSRUN program produces output indicating the success or failure of the requested update. The LOGBKTMS program receives the output from the TMSRUN program and forwards that output via e-mail back to the user 10 on the first computer system 50. Any error messages generated by one or both of the LOGBKTMS and TMSRUN programs are included in the e-mail response sent back to the user.

In the present invention, the second computer 70 maintains the dedicated e-mail address 80. The dedicated e-mail address must be unique within the second computer, but in general the dedicated e-mail address is arbitrarily named. In the preferred embodiment, the dedicated e-mail address is named "logbktms", and corresponds to a pseudo user login of the same name on the second computer system. In an alternate embodiment, the dedicated e-mail address is an alias that redirects the message to a pseudo user login of a different name. As the dedicated e-mail address may be any selected e-mail address on the second computer, multiple dedicated e-mail addressed may be designated for multiple TMS databases that are maintained on the same computer system. In this embodiment, each dedicated e-mail address corresponds to exactly one TMS database.

In the preferred embodiment, the second computer 70 monitors e-mail traffic destined to it's corresponding users, and when it sees an e-mail message addressed for the pseudo user login "logbktms" it automatically forwards that e-mail message to the LOGBKTMS program. In the preferred embodiment, the forwarding is accomplished via a Unix configuration file named ".forward". The configuration and use of the Unix mail system is well known by those skilled in the art and thus not elaborated further herein.

The LOGBKTMS program of the present invention has three main functions: the first is to parse, extract, and reformat data; the second is to submit data to the TMS; and the third is to relay a response back to the user. In a preferred embodiment, the LOGBKTMS program is a Unix shell program or script which executes a predetermined sequence of Unix commands or other programs to accomplish the three main functions.

In accordance with the present invention, the parsing performed by the LOGBKTMS program parses and extracts selected fields from predetermined known locations within the e-mailed copy of electronic logbook entry. In a preferred embodiment, the parsing and extraction is performed by a predetermined sequence of standard Unix pattern-matching commands including but not limited to "egrep", "grep", and "read". The applicable Unix commands are well known by those skilled in the art and are not detailed herein. The pattern-matching commands search the logbook entry for data using fixed strings of characters, which are predetermined by the particular ELS in use.

In a preferred embodiment, if the LOGBKTMS program of the present invention is unable to parse and extract the necessary information, it may respond by sending the user 10 an e-mail message detailing the failure.

In the preferred embodiment, these fields are collected by the LOGBKTMS program in a series of Unix environment variables. The environment variables are then used in a series of output operations by a predetermined sequence of standard Unix commands including but not limited to "print". Again, the applicable Unix commands are well known by those skilled in the art and are not detailed herein. In the present invention the output operations produce formatted entry data in a highly structured format suitable for direct and automated entry into the TMS database.

The LOGBKTMS program executes the TMSRUN program and relays the formatted entry data to that execution of the TMSRUN program. The TMSRUN program itself generally accepts data from users, including other processes such as the LOGBKTMS program, and verifies the data for proper formatting. After successful verification the TMSRUN program updates the TMS database to include the verified data. If verification fails, the TMSRUN program provides error information back to the user about why the failure occurred. In either case, the TMSRUN program provides feedback to it's user about any success or failure. As previously disclosed, the TMSRUN program is a particular example of a generic class of data entry programs for any generic TMS. The TMSRUN program is not part of the present invention.

In a preferred embodiment of the present invention, a single logbook entry may comprise multiple TMS entries, and the LOGBKTMS program accounts for and appropriately generates the proper number and format of outputs. As a result, multiple TMS entries may be generated for any single logbook entry.

As previously disclosed, when the TMSRUN program is executed to update the TMS database, the TMS program produces feedback indicating the success or failure of that update. In the present invention, this feedback is relayed back to the LOGBKTMS program. If the update of the TMS database occurred without error, the feedback is generally very short. If the update of the TMS database was prevented by an error, detailed information about the error may be reported. The LOGBKTMS program then forwards the feedback from the TMSRUN program to the originator of the e-mail entry, specifically the user 10 on the first computer system 50. The originator of the e-mail entry is typically specified by a return address, such as is generally included with e-mail messages. The LOGBKTMS programs does not perform any substantial processing operations on the feedback from the TMSRUN program.

If the update to the TMS database occurred without error, the message the user receives via e-mail is a short affirmative confirmation, typically of one sentence. In the event there was a failure to update the TMS database, the message the user receives via e-mail contains more information about the failure. Typically, a failure to update the TMS database is a result of a data entry error made by the user 10 in the ELS 60. The user is then permitted to correct the logbook entry in the ELS and submit the corrected entry to the LOGBKTMS program for eventual addition to the TMS database. The data in the TMS database is the official data used to track test results and does not have to be synchronized with the data in the logbook entries.

Figure 2:
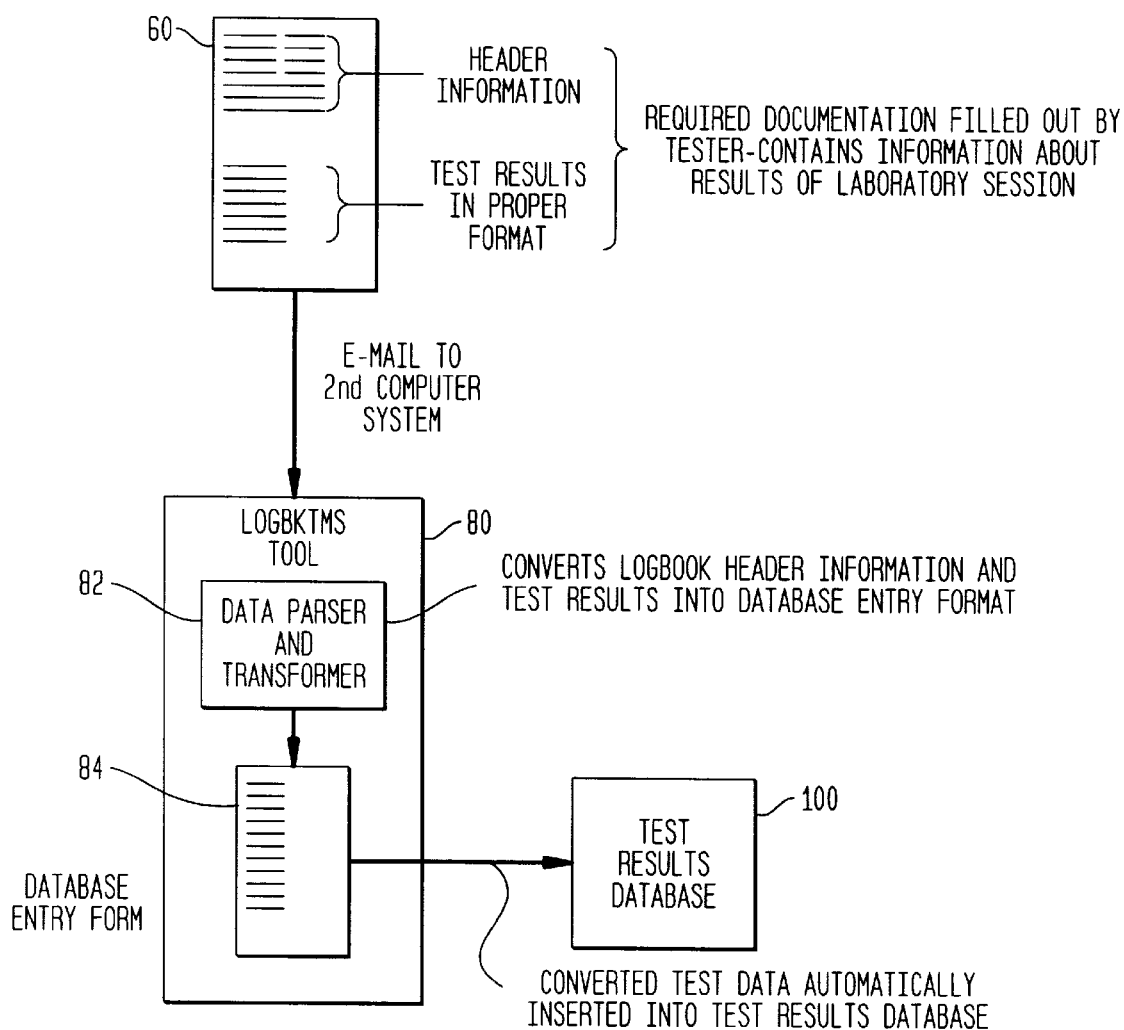
FIG. 2 depicts details of some of the components of FIG. 1.

FIG. 2 illustrates generally the format of the entry into the electronic logbook 60, which is seen to include a header portion and a test results portion. The particular format for the electronic logbook 60 is not part of the invention and may comprise any well known electronic data format for the entry, tracking and processing of data. As previously disclosed, the test results are entered into the electronic logbook 60 in a format that is standardized to be parsed by the LOGBKTMS program 80 in the second computer system. Upon completion of the entry of the test results into the electronic logbook 60, the logbook entry is automatically e-mailed to the LOGBKTMS program 80 in the second computer system, where the test results are parsed, extracted, and transformed in a data parser and transformer 82 into a database entry form 84. Upon running of the TMSRUN program, the parsed and formatted test results update the test results database 100 in TMS 90.

It will be appreciated that the TMS and its host (the second computer system) may service a large number of test sites such as the one under the purview of user 10. Similarly, user 10 will, in all likelihood, be responsible for monitoring and conducting tests on various equipment at different sites, with each being uniquely identified in the header of the electronic logbook entry as well as in the test results database of the TMS.

FIG. 3 is a top level program listing for the LOGBKTMS program for getting the logbook entry from one of the first testing subsystems, extracting data from the logbook header, parsing the test results, updating the test results database, and communicating back to the first testing subsystem. Each line in the listing typically corresponds to a Unix shell program or script, whose operational details are determined by the formats used respectively by the electronic logbook and the TMS, and are thus not detailed herein. This top level program listing is thus essentially representative of a top level flow chart for the LOGBKTMS program of the present invention.

As shown in FIG. 3, the first step of the LOGBKTMS program flow is named "get_logbook_entry", and this step comprises reading the e-mail message which contains the copy of the logbook entry as entered by the user. This step also removes the e-mail message from the mail queue on the second computer system, thus preventing required e-mail storage from growing without bound.

The second step of the LOGBKTMS program flow as illustrated in FIG. 3 comprises a plurality of smaller steps, each one dedicated to particular data parsing and extraction operations. In the illustrated example, the smaller steps are named "get_lab", "get_run_time", "get_load_and_proj", "get_logbk_login", and "get_logbk_entryno". Each of the plurality of smaller steps operates in sequence, parsing and extracting one or more particular data fields per step. In a preferred embodiment, as the data is extracted it is stored in the LOGBKIMS global environment space.

The third step of the LOGBKTMS program flow as shown in FIG. 3 performs a parsing step to parse the test results data It is during this step of the LOGBKTMS program that the determination is made whether to generate one or multiple TMS entries for the particular logbook entry being processed.

The fourth step of the LOGBKTMS program flow submits data to the TMS for database update. In the illustrated example, this step can be bypassed as necessary to debug the LOGBKTMS program itself without polluting the TMS with unrelated testing results. Also in the fourth step appears a housekeeping function to log the usage of the LOGBKTMS program for administrative purposes. It is during the fourth step of the LOGBKTMS program that the TMSRUN program is executed to submit data to the TMS for database update.

The fifth step of the LOGBKTMS program is to send information to the user at the first computer system based on the success or failure of both the LOGBKTMS and TMSRUN program executions.

FIG. 4 illustrates an example of an electronic logbook entry as entered by a user into a particular embodiment of an ELS. This example shows in detail the fields that comprise the header portion and the test results portion of the logbook entry. Fields are generally comprised of textual identifiers, such as "AUTHOR", "LOGIN", and "SUPERVISOR", followed by the corresponding data, such as "Mike Harrison", "michaelj", and "S.Ohnsman", respectively. This figure is meant to be illustrative only; the actual format used by an ELS is not part of the present invention.

FIGS. 5A–5E illustrate examples of TMS entries formatted as required by a particular embodiment of a TMS system. This example shows in detail the data fields that comprise the highly structured format required for a TMS system. As illustrated in FIG. 5A, fields are generally comprised of textual identifiers, such as "setname", "TMSPROJ", and "apprl", followed by the corresponding data, such as "pe_5ee12_regr", "5ee12_1u", and "TWT", respectively. FIGS. 5B–5E show similar TMS entries, which in the illustrated embodiment share many attributes for data values of FIG. 5A, but may have unique attributes or data values for the "tidnum"field, the "status"field, and selected other fields. These figures FIGS. 5A–5E are meant to be illustrative only; the actual format of the entries used for a TMS is not part of the present invention.

FIG. 6 illustrates an example of the mapping process to reformat an electronic logbook entry to a highly structured format suitable for a TMS system. The mapping is shown graphically, with parsed and extracted data fields of the electronic logbook entry shown as circled entries, and arrows showing how those data fields are subsequently used in the generation of corresponding TMS entries. This figure is meant to be illustrative only; the actual format used by an ELS and the entries used for a TMS are not part of the present invention. For any given ELS and TMS, one skilled in the art can construct the necessary sequence of Unix commands to extract the required data fields from the ELS and format them in the format required for the TMS.

What has been described is a novel TMS updating arrangement. The advantages for the user include greater efficiency, due to eliminating the requirement that the user manually enter similar data twice, once in an ELS and once in a TMS. Reliability is improved by providing detailed error reporting and affirmative confirmations of successful TMS database updates. From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method of operating a test data system comprising:
   executing a first computer program for entering test results into an electronic logbook in a first computer system;
   forwarding the entered test results to a logbook program in a second computer system; and
   executing the logbook program to update a test result database in a test management system accessed by the second computer system.

2. The method of claim 1, wherein said executing step further comprises:
   parsing the test results and formatting them for database entry in the test management system; and
   running a test management system program to update the test results database with the parsed test results.

3. The method of claim 2, further comprising:
   sending updated database confirmation and any error messages to the first computer system.

4. The method of claim 3, wherein the forwarding step comprises:
   delivering the test results to an e-mail address of the logbook program in the second computer system.

5. The method of claim 4, wherein the entering step is performed by a user.

6. A test data system comprising:
   a first computer system including an electronic logbook;
   means for entering test results in said electronic logbook;
   a second computer system including a logbook program;
   means for automatically forwarding said test results to said logbook program;
   a test management system accessed by said second computer system, said test management system including a test management program and a test results database; and
   wherein said test management program is run, upon execution of said logbook program, to update said test results database with said test results.

7. The system of claim 6, wherein said electronic logbook program parses said test results and formats said parsed test results for entry in said test results database.

8. The system of claim 7, wherein said electronic logbook includes an e-mail address of said logbook program in said second computer system.

9. The system of claim 8, wherein said logbook program sends updated database confirmation and any error messages back to said first computer system via a return e-mail address.

10. The system of claim 9, wherein a user enters said test results in said electronic logbook.

11. A test management system comprising:
    a first testing subsystem for testing, responsive to test scripts, components of an electronic switching system for results and for storing the results into an electronic logbook;
    second testing subsystem comprising a test management subsystem for storing the test scripts and for storing in a test results database, the results associated with the execution of the respective test scripts by the first testing subsystem;
    means for automatically forwarding the results from the first testing subsystem to the second testing subsystem; and
    logbook means for parsing and entering the results from the first testing subsystem into the test results database.

12. The system as in claim 11, wherein the logbook means is further comprised of an electronic logbook program, having an associated e-mail address, and a computer responsive to the electronic logbook program;
    wherein the means for automatically forwarding initiates communication of the results to the associated e-mail address, wherein the logbook means is responsive to the communication to update the test results database.

13. The system as in claim 12, wherein the logbook means further provides for communicating the status of the update of the test results database to the first testing subsystem.

14. The system as in claim 13, wherein the logbook means further provides for the communications of an error message to the first testing subsystem.

15. The system as in claim 12, wherein there are a plurality of separate ones of the first testing subsystems;
    wherein the means for automatically forwarding provides for automatically forwarding the results for each of the separate ones of the first testing subsystems to the second testing subsystem; and
    wherein the logbook means provides for automatically updating the test results database for each of the plurality of first testing subsystems.

16. The system as in claim 15, wherein each of the plurality of first testing subsystems is uniquely identified in a header of the respective results.

17. The system as in claim 15, wherein each of the plurality of first testing subsystems is uniquely identified within the test results database.

18. The system as in claim 12, wherein there are a plurality of separate ones of the first testing subsystems and wherein there are a plurality of e-mail addresses associated with the electronic logbook program;
    wherein the means for automatically forwarding provides for automatically forwarding the results for each of the separate ones of the first testing subsystems to a respective associated one of the plurality of e-mail addresses in the second testing subsystem; and
    wherein the logbook means provides for automatically updating the test results database for each of the plurality of first testing subsystems responsive to the plurality of e-mail addresses.

* * * * *